US012539399B2

(12) United States Patent
Lackey et al.

(10) Patent No.: US 12,539,399 B2
(45) Date of Patent: Feb. 3, 2026

(54) CATHETER ASSEMBLY HAVING AN ADJUSTABLE SIDE PORT ANGLE AND RELATED METHODS

(71) Applicant: Becton, Dickinson and Company, Franklin Lakes, NJ (US)

(72) Inventors: Breanna Lackey, West Valley City, UT (US); John Lackey, West Valley City, UT (US); Megan Scherich, Salt Lake City, UT (US); Benjamin Hopwood, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 716 days.

(21) Appl. No.: 17/745,184

(22) Filed: May 16, 2022

(65) Prior Publication Data

US 2022/0370765 A1 Nov. 24, 2022

Related U.S. Application Data

(60) Provisional application No. 63/190,641, filed on May 19, 2021.

(51) Int. Cl.
*A61M 25/00* (2006.01)
*A61M 25/06* (2006.01)
*A61M 39/02* (2006.01)
*A61M 39/10* (2006.01)
*A61M 39/12* (2006.01)
(Continued)

(52) U.S. Cl.
CPC .... *A61M 25/0606* (2013.01); *A61M 25/0023* (2013.01); *A61M 25/0043* (2013.01); *A61M 25/0097* (2013.01); *A61M 39/0247* (2013.01); *A61M 39/12* (2013.01); *A61M 39/162* (2013.01); *A61M 39/225* (2013.01); *A61M 2025/0019* (2013.01); *A61M 2025/0036* (2013.01); *A61M 2039/0258* (2013.01); *A61M 2039/1072* (2013.01); *A61M 2039/1077* (2013.01)

(58) Field of Classification Search
CPC .......... A61M 25/0097; A61M 25/0606; A61M 39/1011; A61M 39/12; A61M 2039/1033; A61M 2039/248; F16K 11/056; F16K 11/0876; F16K 11/0853; F16K 11/0873
See application file for complete search history.

(56) References Cited

U.S. PATENT DOCUMENTS

4,874,378 A * 10/1989 Hillstead .......... A61M 25/0662
604/533
5,755,702 A 5/1998 Hillstead et al.
(Continued)

*Primary Examiner* — Michael J Tsai
*Assistant Examiner* — Katerina A. Wittliff
(74) *Attorney, Agent, or Firm* — The Webb Law Firm (57) ABSTRACT

A catheter assembly may include a catheter adapter, which may include a body and a side port extending outwardly from the body. The body may include a distal end, a proximal end, and an inner surface extending through the distal end and the proximal end and forming a lumen. An angle of the side port with respect to a longitudinal axis of the body may be adjustable. The catheter assembly may include a catheter extending distally from the distal end of the catheter adapter. The catheter assembly may include a septum disposed within the lumen proximal to a side port pathway extending through the side port and in fluid communication with the lumen.

7 Claims, 12 Drawing Sheets

(51) Int. Cl.
    *A61M 39/16*     (2006.01)
    *A61M 39/22*     (2006.01)

(56) References Cited

U.S. PATENT DOCUMENTS

| | | | |
|---|---|---|---|
| 10,543,354 B2 | 1/2020 | Bihlmaier et al. | |
| 2011/0071502 A1* | 3/2011 | Asai | A61M 25/0606 |
| | | | 604/528 |
| 2018/0154112 A1* | 6/2018 | Chan | A61M 25/0606 |
| 2018/0304041 A1 | 10/2018 | Leeflang | |
| 2020/0078579 A1 | 3/2020 | Harding et al. | |
| 2020/0345904 A1 | 11/2020 | Casey et al. | |
| 2020/0360668 A1* | 11/2020 | Blanchard | A61M 25/0606 |

\* cited by examiner

CATHETER ASSEMBLY HAVING AN ADJUSTABLE SIDE PORT ANGLE AND RELATED METHODS

CROSS-REFERENCE TO RELATED APPLICATION

The present application claims priority to U.S. Provisional Application Ser. No. 63/190,641, filed May 19, 2021, entitled "Catheter Assembly Having an Adjustable Side Port Angle and Related Methods", the entire disclosure of which is hereby incorporated by reference in its entirety.

BACKGROUND OF THE INVENTION

A catheter is commonly used to infuse fluids into vasculature of a patient. For example, the catheter may be used for infusing normal saline solution, various medicaments, or total parenteral nutrition. The catheter may also be used for withdrawing blood from the patient.

The catheter may include an over-the-needle peripheral intravenous ("IV") catheter. In this case, the catheter may be mounted over an introducer needle having a sharp distal tip. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient.

In order to verify proper placement of the introducer needle and/or the catheter in the blood vessel, a clinician generally confirms that there is "flashback" of blood in a flashback chamber of a catheter assembly that includes the catheter. After placement of the needle has been confirmed, the clinician may remove the needle, leaving the catheter in place for future blood withdrawal or fluid infusion.

Many catheter assemblies have a septum proximal to an extension tube inlet, creating a region distal to the septum that is difficult to flush free of fluids (such as blood or infusates). Stagnant fluid within the region distal to the septum may lead to accumulation of bacteria within the catheter assembly, which may result in infection or removal of the catheter from the patient.

The subject matter claimed herein is not limited to embodiments that solve any disadvantages or that operate only in environments such as those described above. Rather, this background is only provided to illustrate one example technology area where some implementations described herein may be practiced.

SUMMARY OF THE INVENTION

The present disclosure relates generally to vascular access devices and related methods. In some embodiments, the present disclosure relates in particular to a catheter assembly having an adjustable side port angle. In some embodiments, a catheter assembly may include a catheter adapter, which may include a body and a side port extending outwardly from the body. In some embodiments, the body may include a distal end, a proximal end, and an inner surface extending through the distal end of the body and the proximal end of the body and forming a lumen. In some embodiments, an angle of the side port with respect to a longitudinal axis of the body may be adjustable.

In some embodiments, the catheter assembly may include a catheter extending distally from the distal end of the catheter adapter. In some embodiments, the catheter assembly may include a septum disposed within the lumen proximal to the side port pathway. In some embodiments, the side port may be movable from a first position at a first angle with respect to the longitudinal axis of the body to a second position at a second angle with respect to the longitudinal axis of the body.

In some embodiments, the first angle may be less than the second angle. In some embodiments, the first angle may be acute, and the second angle may be obtuse. In some embodiments, the first angle and the second angle may be acute, and the first angle may be more acute than the second angle. In some embodiments, the first position and the second position may be in a same plane. In some embodiments, the side port may extend in a proximal direction in the first position at the first angle, and the side port may extend in a distal direction in the second position at the second angle.

In some embodiments, the body may include a socket. In some embodiments, a distal end of the side port may include a ball moveable within the socket. In some embodiments, an outer surface of the ball may include a snap feature configured to engage with the socket in response to the side port being in the first position or the second position.

In some embodiments, the side port may include a side port fluid pathway extending through the side port. In some embodiments, the side port fluid pathway may extend through the ball. In some embodiments, the socket may include a first opening and a second opening. In some embodiments, the side port fluid pathway may be aligned with the first opening when the side port is in the first position. In some embodiments, the side port fluid pathway may be aligned with the second opening when the side port is in the second position. In some embodiments, the first opening and the second opening may be in fluid communication with the lumen.

In some embodiments, the side port may be coupled to the body at a pin joint. In these and other embodiments, the side port may be movable from the first position at the first angle with respect to the longitudinal axis of the body to the second position at the second angle with respect to the longitudinal axis of the body. In some embodiments, the side port may be disposed in a snap fit with the body when the side port is in the first position and/or the second position.

In some embodiments, the side port may be flexible and configured to move from the first position at the first angle with respect to the longitudinal axis of the body to the second position at a second angle with respect to the longitudinal axis of the body. In some embodiments, the body may have a greater durometer than the side port. In some embodiments, the catheter adapter may include a casing extending outwardly from the body. In some embodiments, the side port may be disposed within the casing and comprising a protrusion. In some embodiments, the casing may include an opening. In some embodiments, in response to the side port being in the first position, the protrusion may be disposed at a first location within the opening. In some embodiments, in response to the side port being in the second position, the protrusion may be disposed at a second location within the opening.

In some embodiments, a method may include moving the side port of the catheter assembly. In some embodiments, moving the side port of the catheter assembly comprises moving the side port from the first position at the first angle with respect to the longitudinal axis of the body to the second position at the second angle with respect to the longitudinal axis of the body. In some embodiments, the method may include moving the side port from the second position at the second angle with respect to the longitudinal axis of the body to the first position with respect to the longitudinal axis of the body. In some embodiments, after moving the side port from the second position at the second angle with respect to the longitudinal axis of the body to the first position with respect to the longitudinal axis of the body, the method may include inserting a probe through the side port. In some embodiments, the method may include inserting a probe through the side port when the side port is in the first position.

It is to be understood that both the foregoing general description and the following detailed description are examples and explanatory and are not restrictive of the invention, as claimed. It should be understood that the various embodiments are not limited to the arrangements and instrumentality illustrated in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE DRAWINGS

Example embodiments will be described and explained with additional specificity and detail through the use of the accompanying drawings in which.

DETAILED DESCRIPTION

Figure 1A:
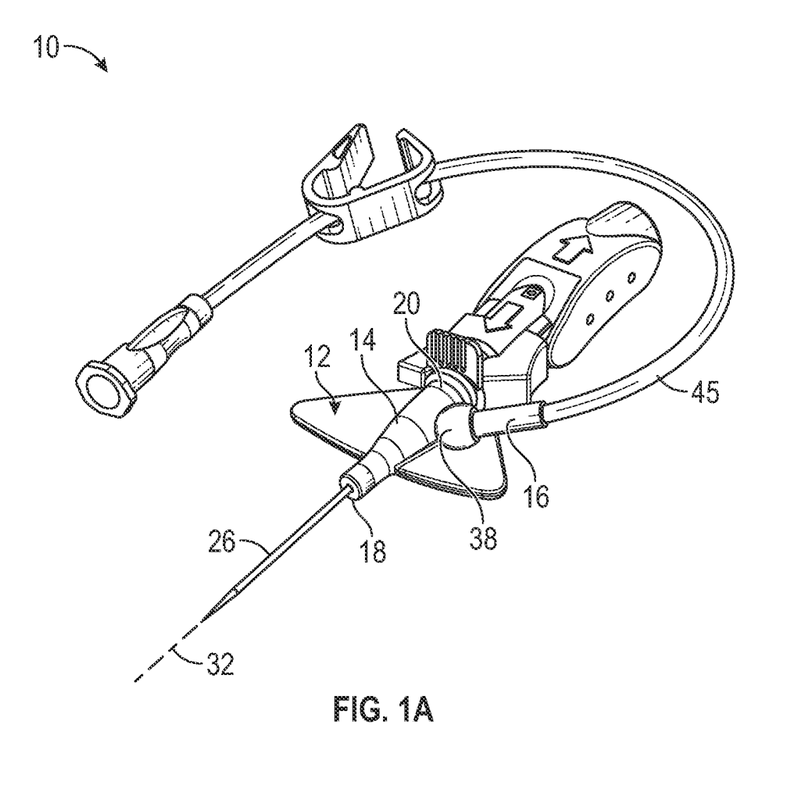
FIG. 1A is an upper perspective view of an example catheter assembly, illustrating an example ball and socket joint, according to some embodiments.
Figure 1B:
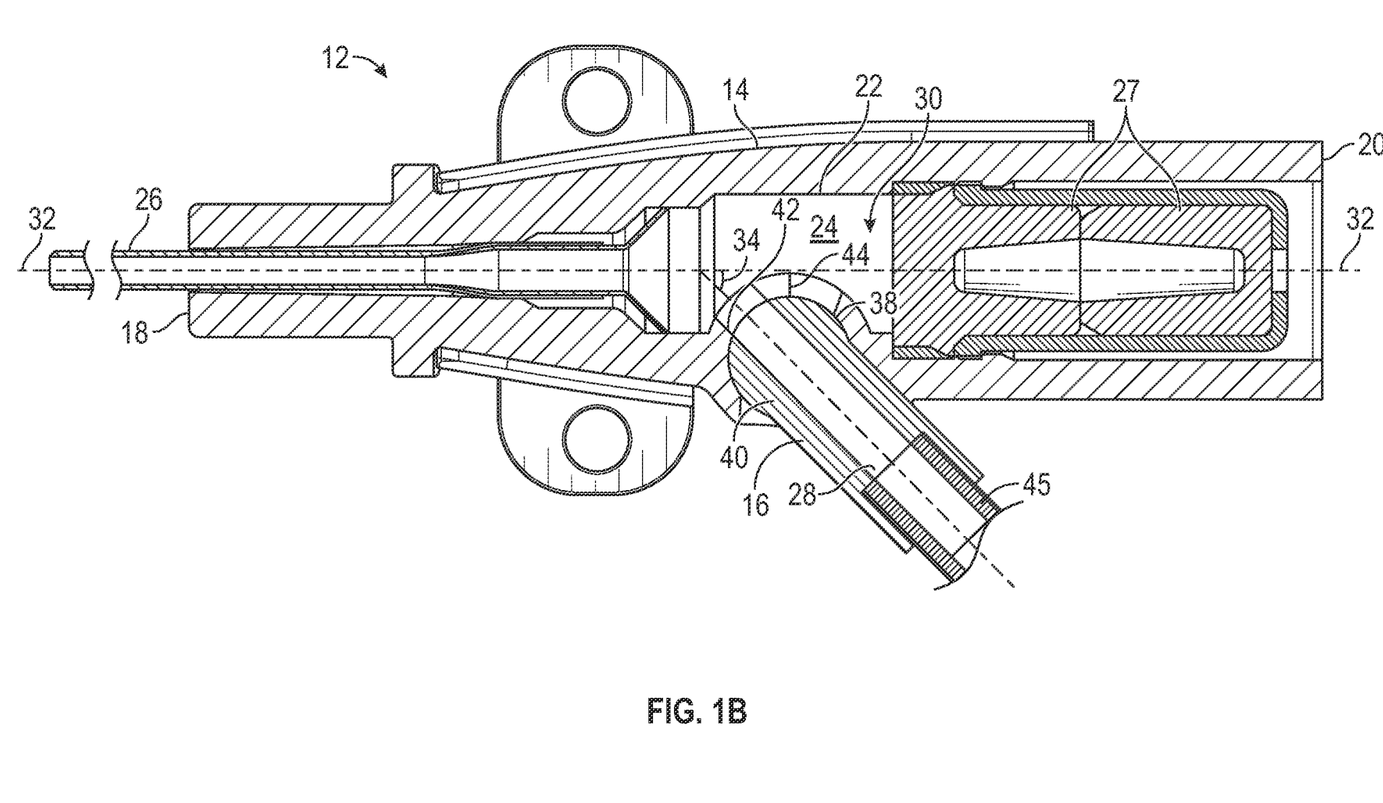
FIG. 1B is a cross-sectional view of the catheter assembly, illustrating an example side port in a first position, according to some embodiments.
Figure 1C:
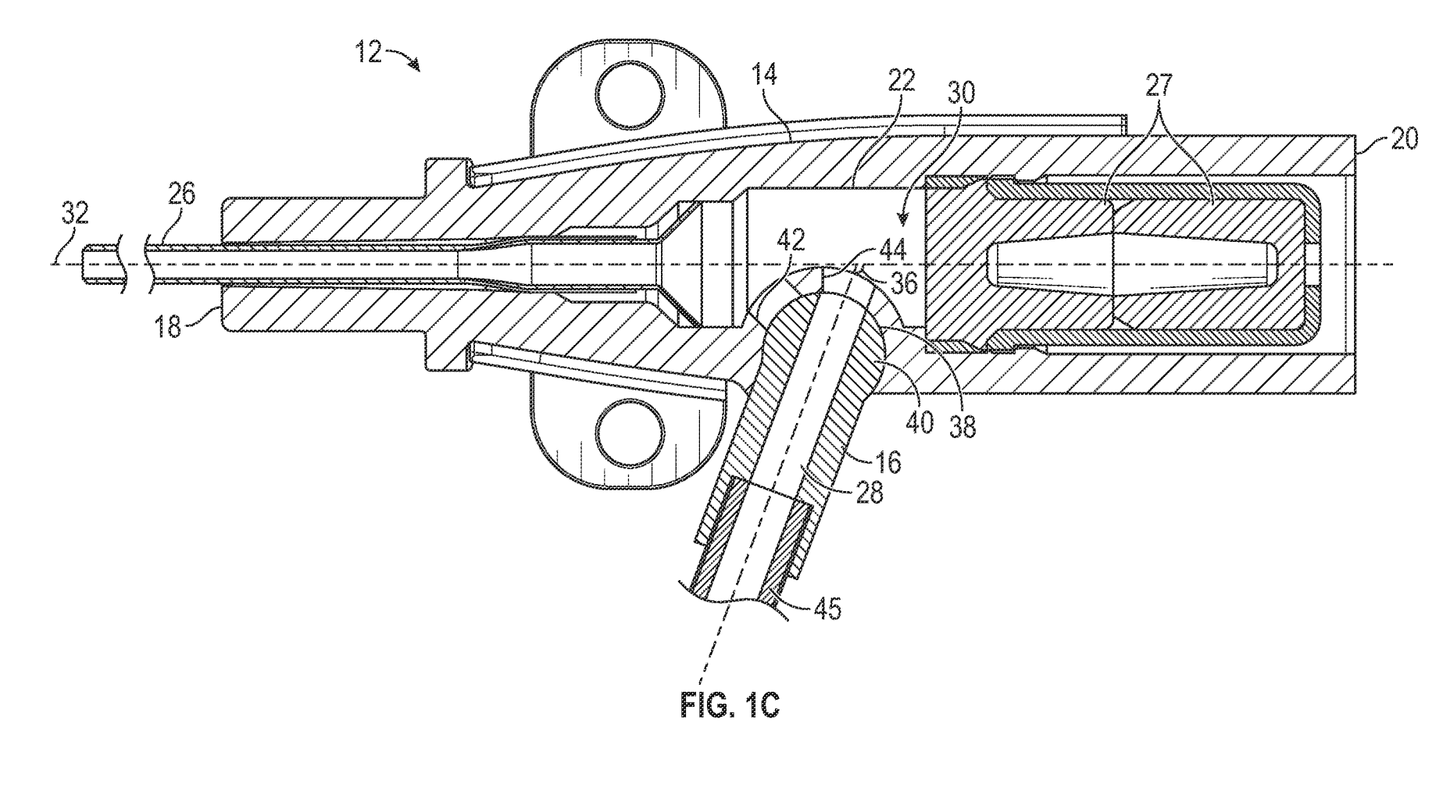
FIG. 1C is a cross-sectional view of the catheter assembly, illustrating the side port in a second position, according to some embodiments.

Referring now to FIGS. 1A-1C, a catheter assembly 10 is illustrated. In some embodiments, the catheter assembly 10 may include a catheter adapter 12, which may include a body 14 and a side port 16 extending outwardly from the body 14. In some embodiments, the body 14 may include a distal end 18, a proximal end 20, and an inner surface 22 forming a lumen 24. In some embodiments, the lumen 24 may extend through the distal end 18 and the proximal end 20.

In some embodiments, the catheter assembly 10 may include a catheter 26 extending distally from the distal end 18 of the body 14. In some embodiments, the catheter 26 may be secured within the body 14. In some embodiments, the catheter 26 may include a peripheral intravenous catheter, a peripherally-inserted central catheter, or a midline catheter. In some embodiments, a needle hub may be coupled to an introducer needle, which may extend through the catheter 26 and may be removed after the catheter 26 is placed within vasculature of a patient.

In some embodiments, the catheter adapter 12 may include a septum 27 disposed within the lumen 24 proximal to the side port 16 and/or a side port fluid pathway 28 extending through the side port 16 and in fluid communication with the lumen 24. In some embodiments, the catheter adapter 12 may include a region 30 in which fluid may tend to become stagnant. In some embodiments, the region 30 may include a distal face of the septum 27 and an area within the lumen 24 adjacent to the distal face of the septum 27. Stagnant fluid within the region 30 may lead to an accumulation of bacteria within the catheter assembly 10, which may result in infection or removal of the catheter 26 from the patient.

In some embodiments, an angle of the side port 16 (which may be measured from a central axis of the side port 16) with respect to a longitudinal axis 32 may be adjustable. In some embodiments, the side port 16 may be movable from a first position to a second position. In some embodiments, the side port 16 may be at a first angle 34 with respect to the longitudinal axis 32 of the body 14 when the side port 16 is in the first position. In some embodiments, the side port 16 may be at a second angle 36 with respect to the longitudinal axis 32 of the body 14 when the side port 16 is in the second position. FIG. 1B illustrates the side port 16 in the first position and at the first angle 34, according to some embodiments. FIG. 1C illustrates the side port in the second position at the second angle 36, according to some embodiments.

In some embodiments, the first angle 34 and the second angle 36 may vary. In some embodiments, the first angle 34 may be about 25 degrees and/or the second angle 36 may be about 45 degrees. In some embodiments, the first angle 34 may be less than the second angle 36. In some embodiments, the first angle 34 may be acute, and the second angle 36 may be obtuse, as illustrated, for example, in FIGS. 1B-1C. In some embodiments, the first angle 34 and the second angle 36 may be acute, and the first angle 34 may be more acute than the second angle 36. In some embodiments, the first position and the second position may be in a same plane. In some embodiments, the side port 16 may extend in a proximal direction in the first position at the first angle 34, and the side port may extend in a distal direction in the second position at the second angle 36. In some embodiments, the first position may facilitate insertion of a probe distally through the side port 16 and/or the catheter 26. In some embodiments, the second position may facilitate flushing of the region 30, which may reduce build-up of blood on the inner surface 22 and/or reduce interactions of incompatible fluids.

In some embodiments, the body 14 may include a socket 38. In some embodiments, a distal end of the side port 16 may include a ball 40 moveable within the socket 38, which may be generally spherical. In some embodiments, the side port 16 may include the side port fluid pathway 28 extending through the side port 16. In some embodiments, the side port fluid pathway 28 may extend through the ball 40.

In some embodiments, the socket 38 may include a first opening 42 and a second opening 44. In some embodiments, the side port fluid pathway 28 may be aligned with the first opening 42 when the side port 16 is in the first position. In some embodiments, the side port fluid pathway 28 may be aligned with the second opening 44 when the side port 16 is in the second position. In some embodiments, the first opening 42 and the second opening 44 may be in fluid communication with the lumen 24. In some embodiments, a distal end of an extension tube 45 may be integrated with the side port 16. In some embodiments, a proximal end of the extension tube 45 may be coupled to an infusion device, a flush device, or a blood collection device.

In some embodiments, a method may include moving the side port 16 of the catheter assembly 10. In some embodiments, moving the side port 16 of the catheter assembly 10 may include moving the side port 16 from the first position at the first angle 34 to the second position at the second angle 36. In some embodiments, the method may include moving the side port 16 from the second position at the second angle 36 to the first position at the first angle 34. In some embodiments, after moving the side port 16 from the second position to the first position, the method may include inserting a probe distally through the side port 16 and/or the catheter 26. In some embodiments, after moving the side port 16 from the first position to the second position, the method may include infusing or flushing fluid, such as, for example, saline solution, distally through the side port 16 into the lumen 24.

Figure 1D:
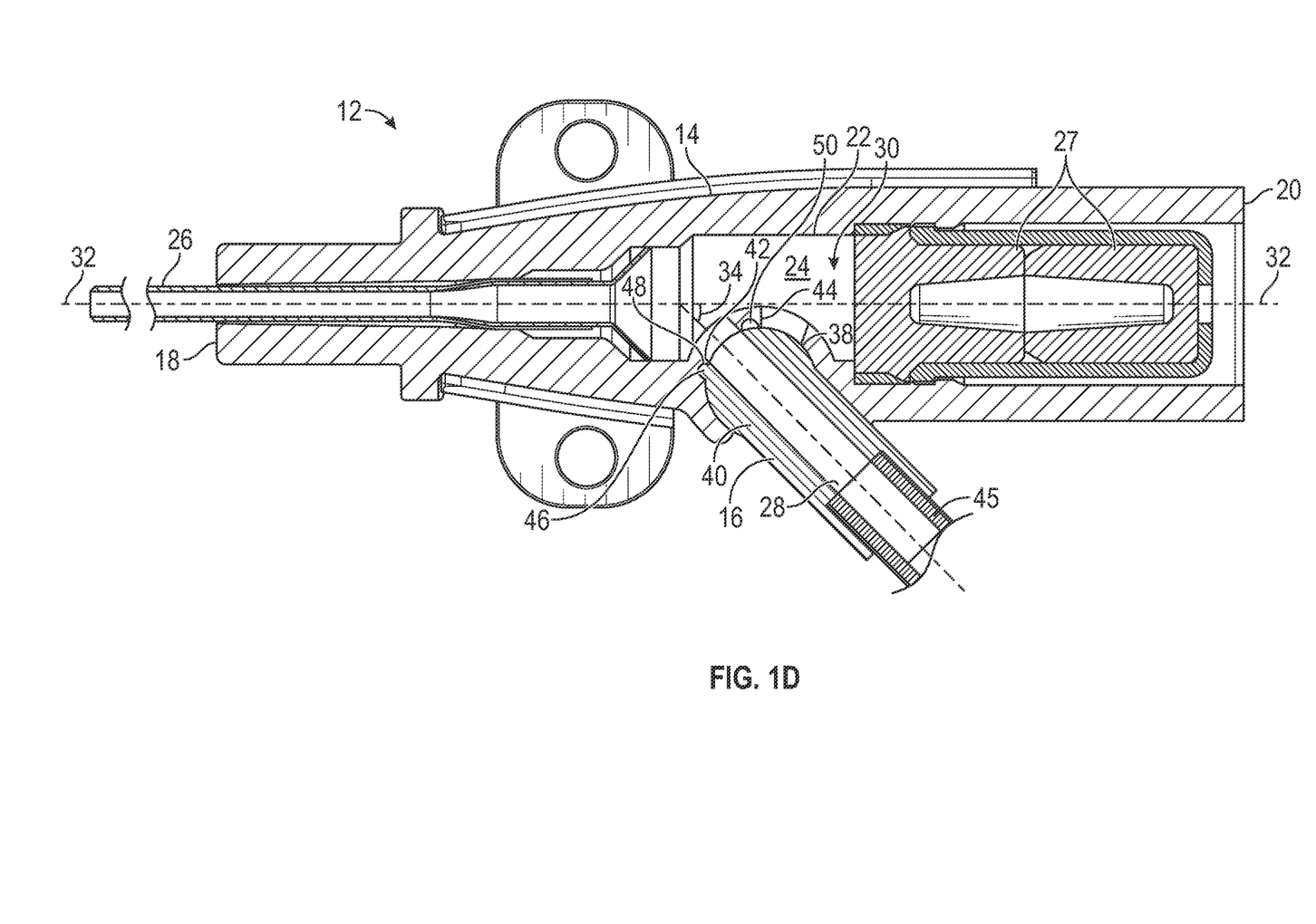
FIG. 1D is a cross-sectional view of the catheter assembly, illustrating an example side port in a first position and an example snap feature, according to some embodiments.
Figure 1E:
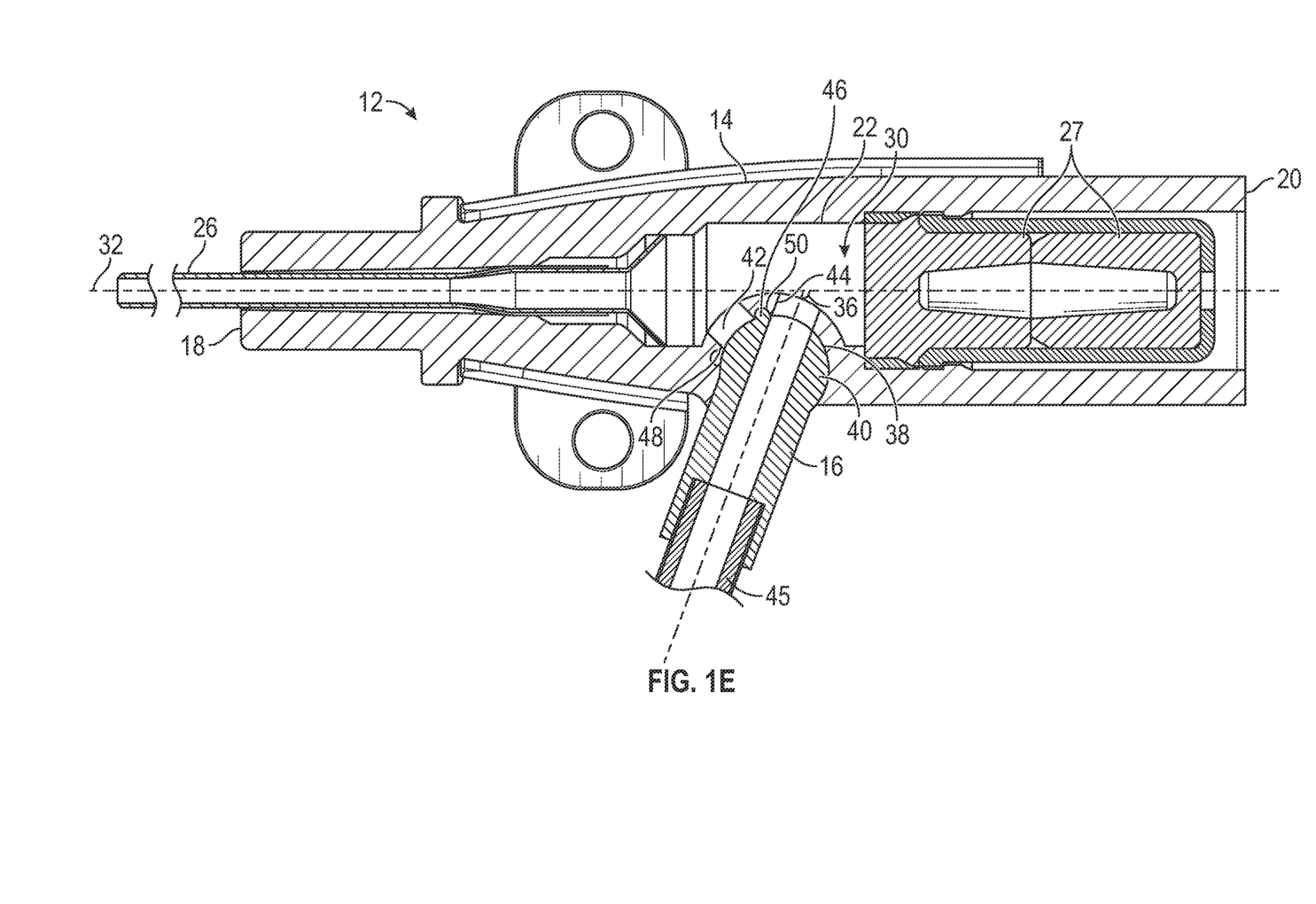
FIG. 1E is a cross-sectional view of the catheter assembly, illustrating the side port in a second position and the snap feature, according to some embodiments.

Referring now to FIGS. 1D-1E, in some embodiments, an outer surface of the ball 40 may include a snap feature 46 configured to engage with the socket 38 in response to the side port 16 being in the first position and/or the second position. In some embodiments, the snap feature 46 may include a protrusion, which may fit or snap within a groove of the socket 38. In some embodiments, the protrusion may fit or snap within a first groove 48 and/or a second groove 50. It is understood that, in some embodiments, the socket 38 may include the protrusion, and the outer surface of the ball 40 may include the first groove 48 and/or the second groove 50.

Figure 2A:
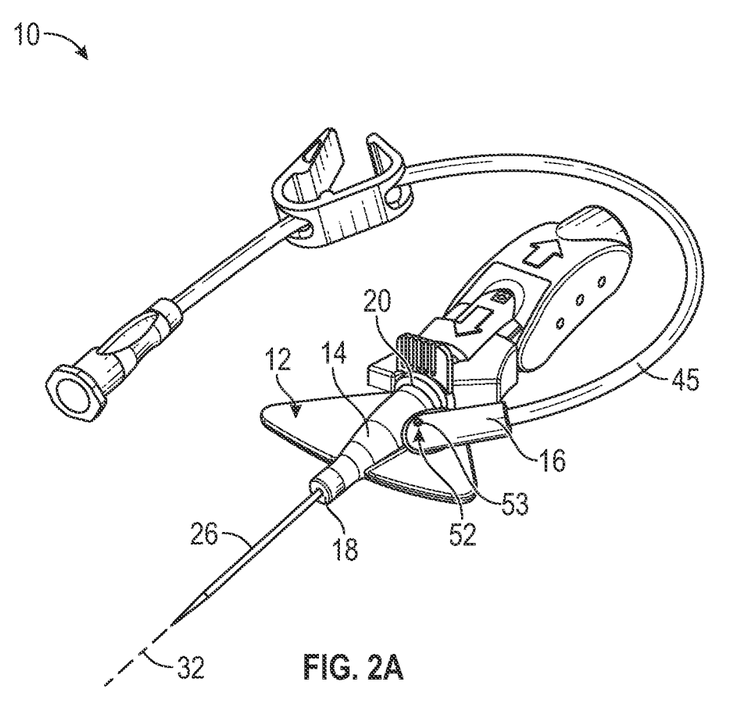
FIG. 2A is an upper perspective view of the catheter assembly, illustrating an example pin joint, according to some embodiments.
Figure 2B:
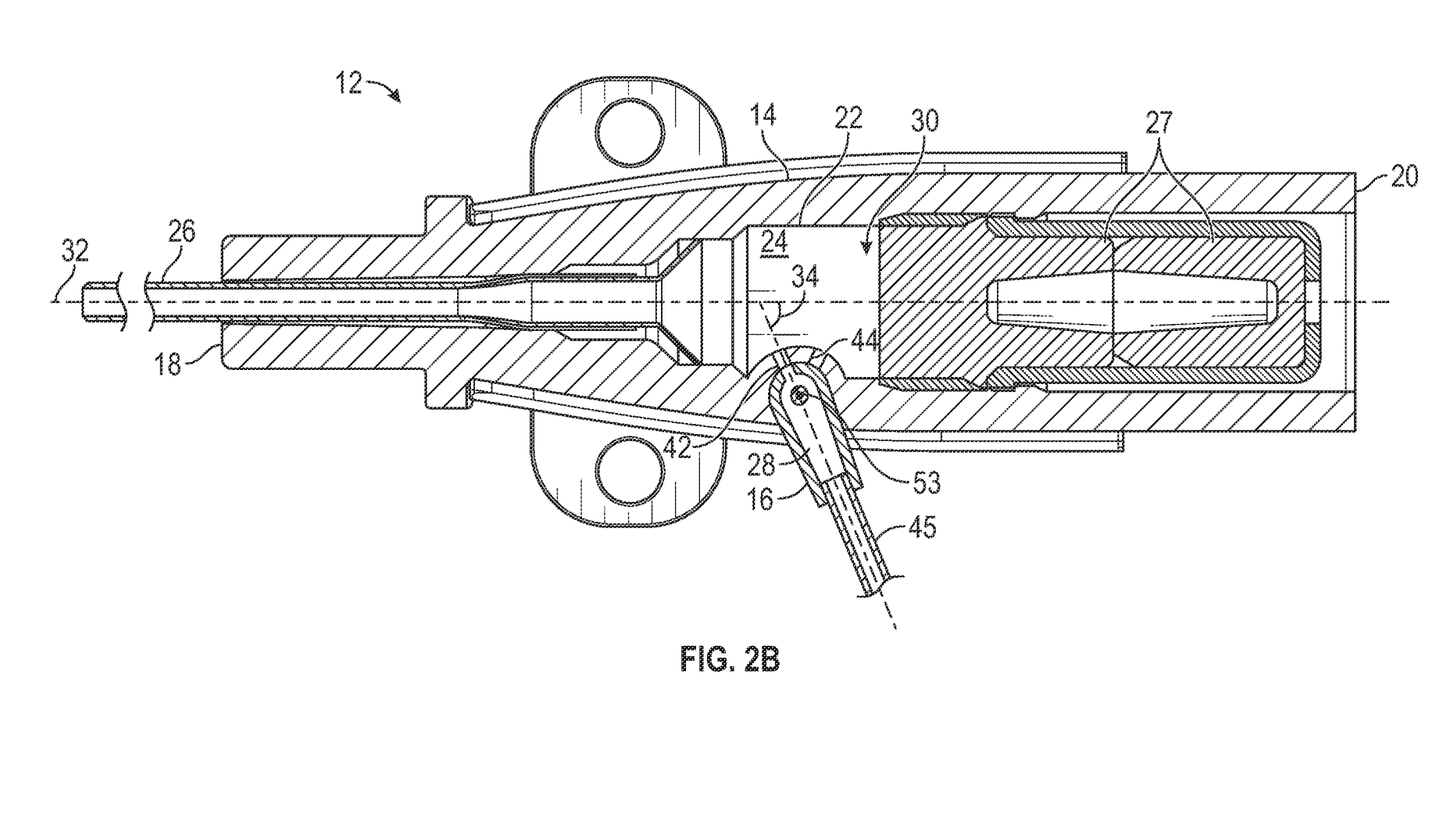
FIG. 2B is a cross-sectional view of the catheter assembly, illustrating the side port in the first position, according to some embodiments.
Figure 2C:
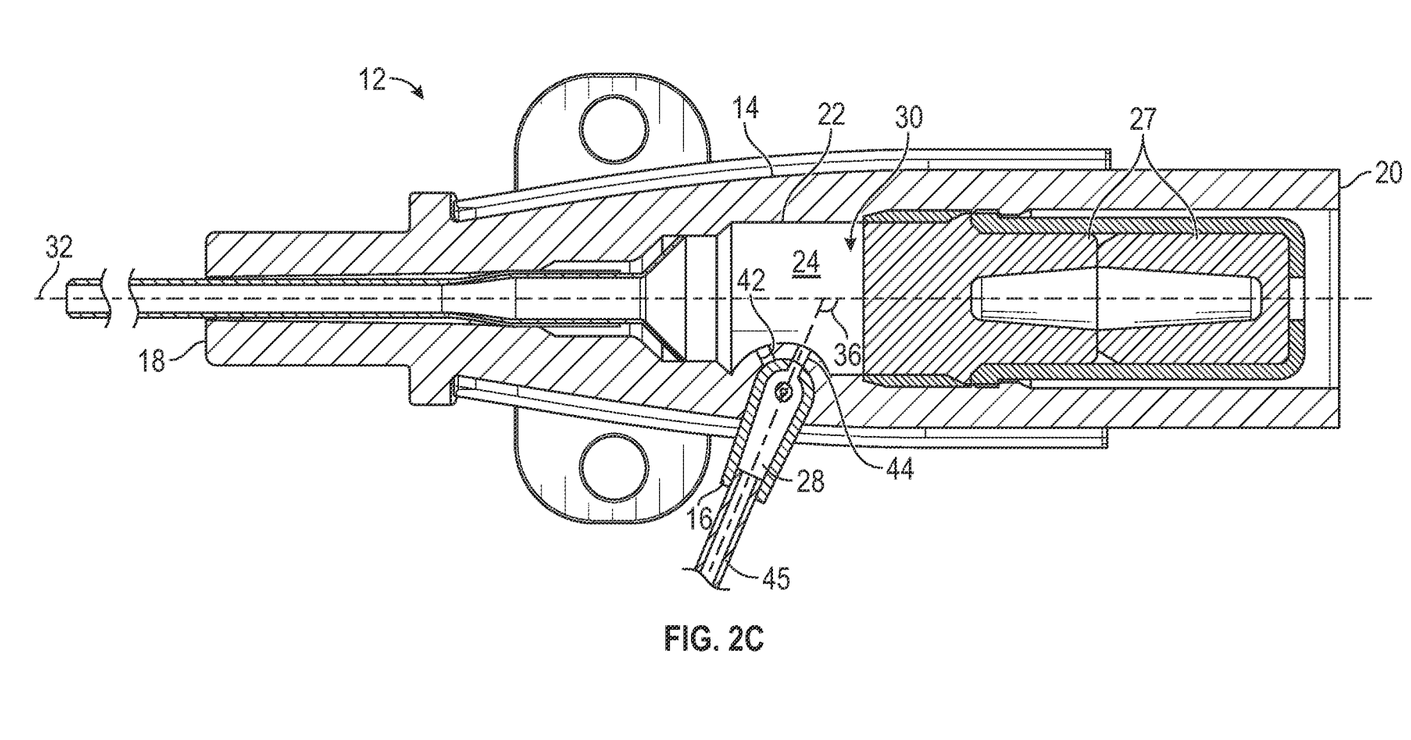
FIG. 2C is a cross-sectional view of the catheter assembly, illustrating the side port in the second position, according to some embodiments.

Referring now to FIGS. 2A-2C, in some embodiments, the side port 16 may be coupled to the body 14 at a pin joint 52. In these and other embodiments, the side port 16 may be movable from the first position at the first angle 34 with respect to the longitudinal axis 32 of the body 14 to the second position at the second angle 36 with respect to the longitudinal axis 32 of the body 14.

In some embodiments, the body 14 may include the first opening 42 and the second opening 44, which may be disposed within a rounded inwardly extending surface similar to the socket 38 of FIGS. 1B-1D. In some embodiments, the side port fluid pathway 28 may be aligned with the first opening 42 when the side port 16 is in the first position. In some embodiments, the side port fluid pathway 28 may be aligned with the second opening 44 when the side port 16 is in the second position. In some embodiments, the first opening 42 and the second opening 44 may be in fluid communication with the lumen 24. In some embodiments, the distal end of the extension tube 45 may be integrated with the side port 16. In some embodiments, the proximal end of the extension tube 45 may be coupled to an infusion device, a flush device, or a blood collection device.

In some embodiments, after moving the side port 16 from the second position to the first position, a probe distally may be inserted distally through the side port 16 and/or the catheter 26. In some embodiments, after moving the side port 16 from the first position to the second position, fluid may be infused or flushed distally through the side port 16 into the lumen 24.

In some embodiments, the side port 16 may be disposed in a snap fit with the body 14 when the side port 16 is in the first position and/or the second position. In further detail, an outer surface of the side port 16 may include the snap feature 46 (see, for example, FIGS. 1D-1E) configured to engage with the body 14 in response to the side port 16 being in the first position and/or the second position. It is understood that, in some embodiments, the body 14 may include the snap feature 46, and the outer surface of the side port 16 may include the first groove 48 and/or the second groove 50 (see, for example, FIGS. 1D-1E).

In some embodiments, the pin joint 52 may include a pin 53, which may extend into and/or through the side port 16. In some embodiments, the pin 53 may be surround by a wall of the side port 16 to prevent contact with fluid within the side port fluid pathway 28.

Figure 3A:
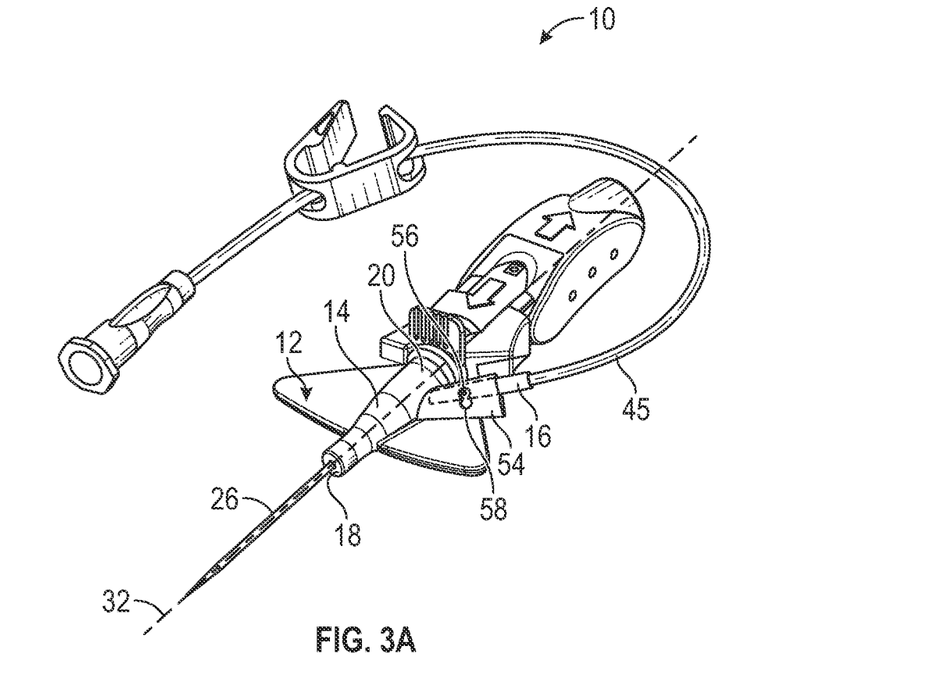
FIG. 3A is an upper perspective view of the catheter assembly, illustrating an example casing, according to some embodiments.
Figure 3B:
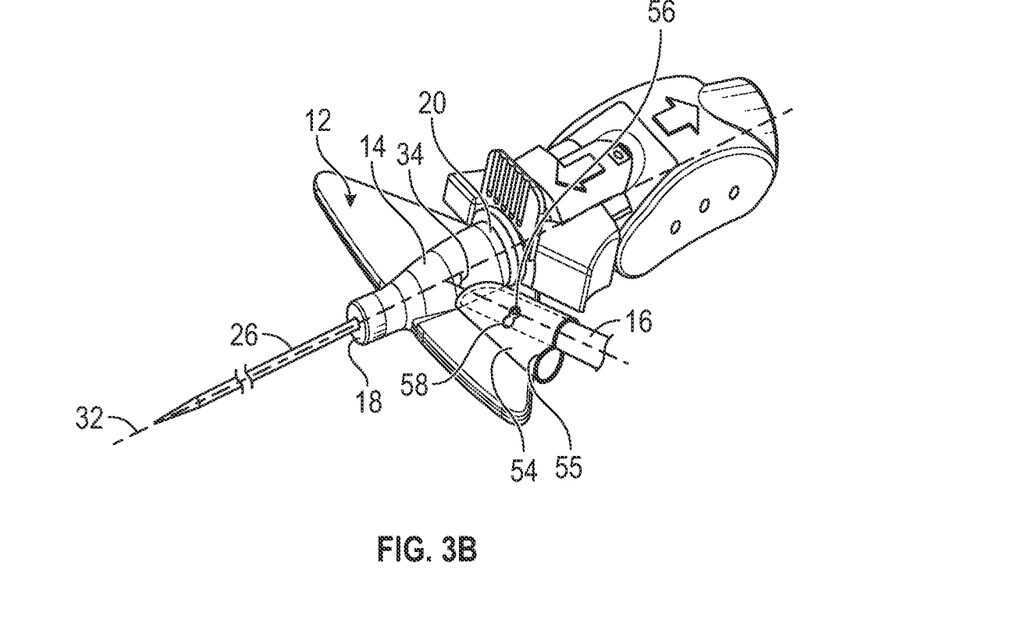
FIG. 3B is an upper perspective view of the catheter assembly, illustrating the side port in the first position, according to some embodiments.
Figure 3C:
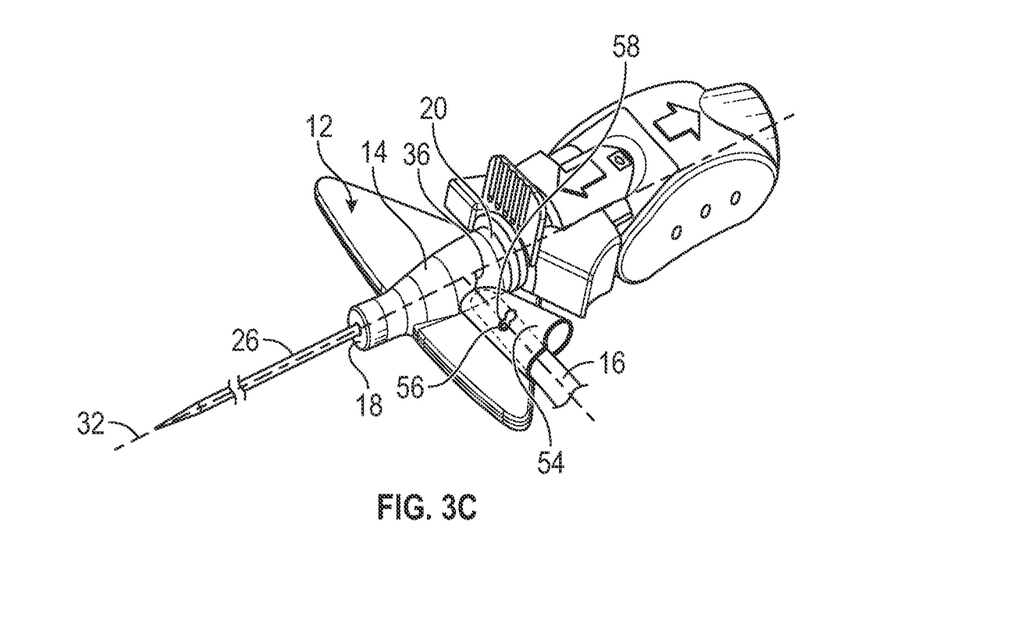
FIG. 3C is a cross-sectional view of the catheter assembly, illustrating the side port in the second position, according to some embodiments.

Referring now to FIGS. 3A-3C, in some embodiments, the side port 16 may be flexible and configured to move from the first position at the first angle 34 with respect to the longitudinal axis of the body 14 to the second position at a second angle 36 with respect to the longitudinal axis of the body 14. As illustrated, for example, in FIGS. 3A-3C, in some embodiments, the first angle 34 and the second angle 36 may be acute, and the first angle 34 may be more acute than the second angle 36. In some embodiments, the body 14 may have a greater durometer than the side port 16. In some embodiments, the catheter adapter may include a casing 54 extending outwardly from the body 14. In some embodiments, the casing 54 may include a narrowed diameter portion 55, which may cause the side port 16 or the extension tube 45 to snap from the first position to the second position.

In some embodiments, the side port 16 may be disposed within the casing 54 and may include a protrusion 56. In some embodiments, the casing 54 may include an opening 58. In some embodiments, in response to the side port 16 being in the first position, the protrusion 56 may disposed at a first location within the opening 58, as illustrated, for example, in FIGS. 3A-3B. In some embodiments, in response to the side port 16 being in the second position, the protrusion 56 may be disposed at a second location within the opening 58, as illustrated, for example, in FIG. 3C. In some embodiments, the opening 58 may include a narrowed diameter portion, which may cause the protrusion 56 to snap from the first position to the second position.

Figure 4A:
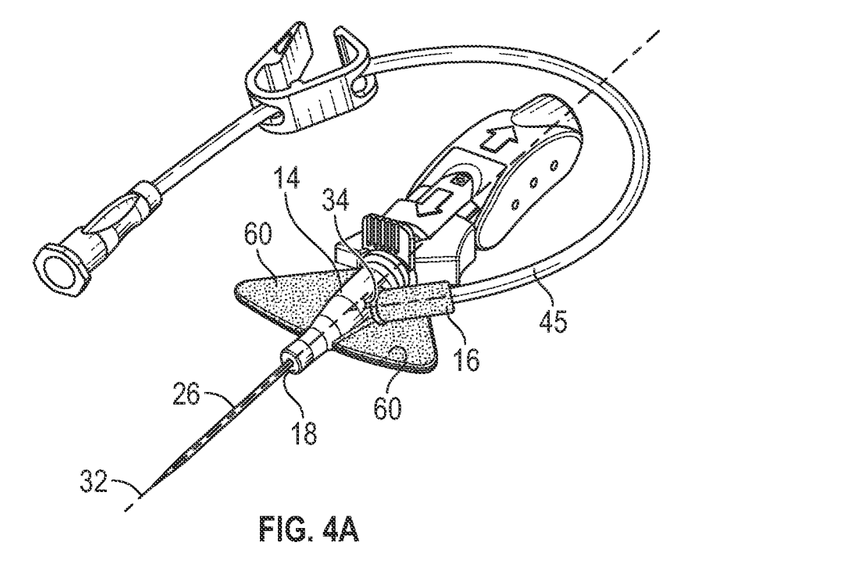
FIG. 4A is an upper perspective view of the catheter assembly, illustrating the side port constructed of a soft material and in the first position, according to some embodiments.
Figure 4B:
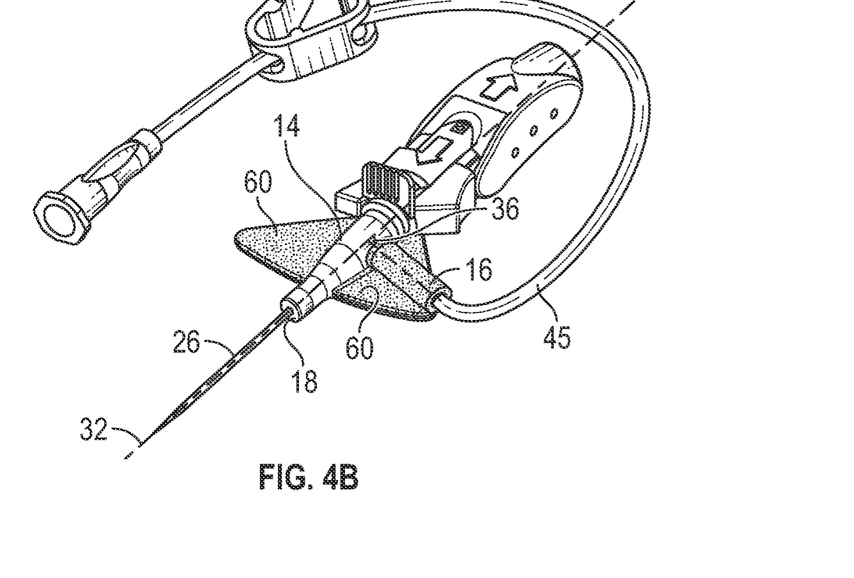
FIG. 4B is an upper perspective view of the catheter assembly, illustrating the side port constructed of the soft material and in the second position, according to some embodiments.

Referring now to FIGS. 4A-4B, in some embodiments, the side port 16 and/or one or more wings 60 may be flexible and constructed of a soft material, as illustrated by the speckled features. In some embodiments, the body 14 may be overmolded or partially or fully covered by the soft material. In some embodiments, the body 14 may have a greater durometer than the side port 16 and/or the wings 60 extending outwardly from the body 14. In some embodiments, the side port 16 may be configured to move between the first position at the first angle 34 and the second position at a second angle 36.

Figure 5A:
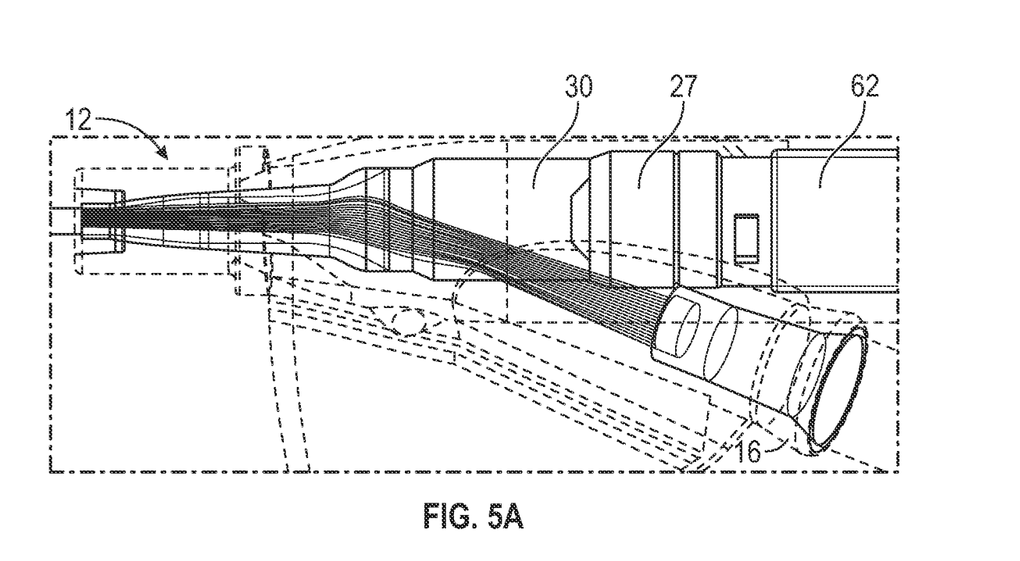
FIG. 5A is an upper perspective of the catheter assembly, illustrating the side port in the first position and fluid flowing distally through the side port, according to some embodiments.
Figure 5B:
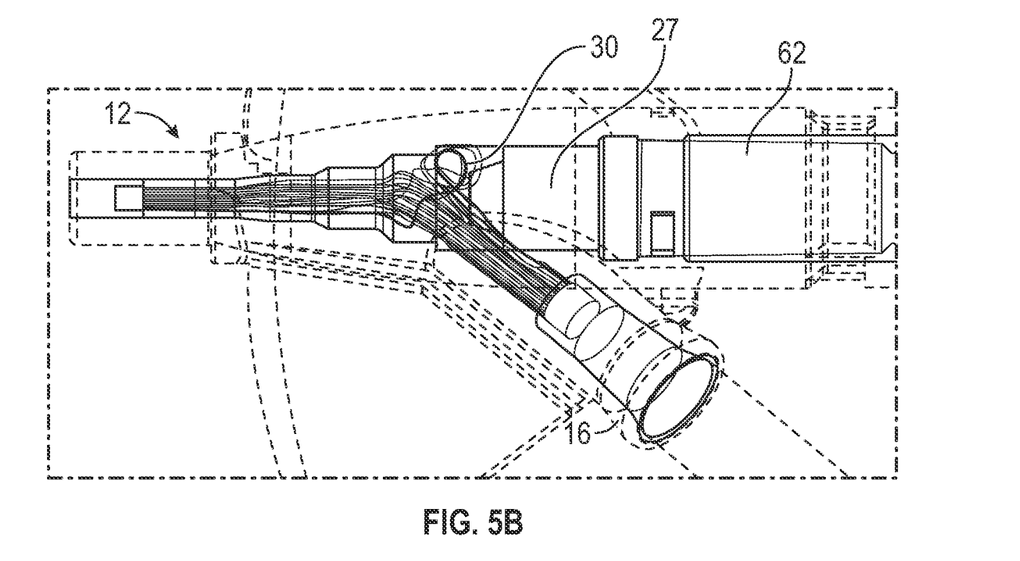
FIG. 5B is an upper perspective of the catheter assembly, illustrating the side port in the second position and fluid flowing distally through the side port, according to some embodiments.

Referring now to FIG. 5A, the side port 16 is illustrated at the first angle 34, according to some embodiments. Referring now to FIG. 5B, the side port 16 is illustrated at the second angle 36, according to some embodiments. In some embodiments, fluid flow distally through the side port 16 at the second angle 36 facilitates flushing of the region 30, as illustrated in FIG. 5B. In some embodiments, the septum 27 may be disposed within a septum canister 62.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A catheter assembly, comprising:
    a catheter adapter, comprising a body and a side port extending outwardly from the body, wherein the body comprises a distal end, a proximal end, and an inner surface extending through the distal end and the proximal end and forming a lumen, wherein an angle of the side port with respect to a longitudinal axis of the body is adjustable;
    a catheter extending distally from the distal end of the catheter adapter; and
    a septum disposed within the lumen proximal to a side port pathway extending through the side port and in fluid communication with the lumen;
    wherein the body comprises a socket, wherein a distal end of the side port comprises a ball moveable within the socket; and
    wherein the side port is movable from a first position at a first angle with respect to the longitudinal axis of the body to a second position at a second angle with respect to the longitudinal axis of the body, wherein the side port comprises a side port fluid pathway extending through the side port, wherein the side port fluid pathway extends through the ball, wherein the socket comprises a first opening and a second opening, wherein the side port fluid pathway is aligned with the first opening when the side port is in the first position, wherein the side port fluid pathway is aligned with the second opening when the side port is in the second position, and wherein the first opening and the second opening are in fluid communication with the lumen.

2. The catheter assembly of claim 1, wherein the side port is movable from a first position at a first angle with respect to the longitudinal axis of the body to a second position at a second angle with respect to the longitudinal axis of the body, wherein the first angle is less than the second angle.

3. The catheter assembly of claim 2, wherein the first position and the second position are in a same plane.

4. The catheter assembly of claim 2, wherein the side port extends in a proximal direction in the first position at the first angle, wherein the side port extends in a distal direction in the second position at the second angle.

5. The catheter assembly of claim 2, wherein the first angle is acute, wherein the second angle is obtuse.

6. The catheter assembly of claim 2, wherein the first angle and the second angle are acute, wherein the first angle is more acute than the second angle.

7. The catheter assembly of claim 1, wherein the side port is movable from a first position at a first angle with respect to the longitudinal axis of the body to a second position at a second angle with respect to the longitudinal axis of the body, wherein an outer surface of the ball comprises a snap feature configured to engage with the socket in response to the side port being in the first position or the second position.

* * * * *